（12）United States Patent
Zaborowski et al.

(10) Patent No.: US 9,381,695 B2
(45) Date of Patent: Jul. 5, 2016

(54) CARD DE-BOWING MECHANISM

(71) Applicant: DATACARD CORPORATION, Minnetonka, MN (US)

(72) Inventors: Alexander Kelly Zaborowski, Minneapolis, MN (US); David E. Wickstrom, Bloomington, MN (US); Rajesh Kalachand Juriasingani, Chaska, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 392 days.

(21) Appl. No.: 13/900,840

(22) Filed: May 23, 2013

(65) Prior Publication Data

US 2014/0345787 A1    Nov. 27, 2014

(51) Int. Cl.
*B29C 53/18* (2006.01)
*B32B 37/00* (2006.01)
*B65H 29/70* (2006.01)
*B29L 17/00* (2006.01)

(52) U.S. Cl.
CPC ............ *B29C 53/18* (2013.01); *B32B 37/0015* (2013.01); *B65H 29/70* (2013.01); *B29L 2017/006* (2013.01); *B65H 2301/512565* (2013.01); *B65H 2701/1914* (2013.01); *Y10T 156/1002* (2015.01)

(58) Field of Classification Search
CPC ............ B29C 53/18; B65H 2301/512; B65H 2301/565; B65H 2301/512565; B32B 37/0015; Y10T 156/1174; Y10T 156/195
See application file for complete search history.

(56) References Cited

U.S. PATENT DOCUMENTS

| | | | | |
|---|---|---|---|---|
| 3,524,337 A | * | 8/1970 | Randmark | B21D 1/02 72/164 |
| 3,535,902 A | * | 10/1970 | Zens | B21D 1/02 72/160 |
| 4,475,896 A | * | 10/1984 | Bains | B29C 53/18 162/271 |
| 4,825,054 A | | 4/1989 | Rust et al. | |
| 5,141,584 A | * | 8/1992 | Schuh | B29C 63/0013 156/702 |
| 5,169,474 A | * | 12/1992 | Binder | B29C 63/0013 156/715 |

(Continued)

FOREIGN PATENT DOCUMENTS

CN    202241970    5/2012
EP    0514915    11/1992

(Continued)

OTHER PUBLICATIONS

International Search Report and Written Opinion for International Application No. PCT/US2014/036320, Mailed Aug. 22, 2014, 11 pgs.

*Primary Examiner* — Mark A Osele
(74) *Attorney, Agent, or Firm* — Hamre, Schumann, Mueller & Larson, P.C.

(57) ABSTRACT

A substrate de-bowing mechanism, system and method are described. The mechanism can include a substrate support, one or more stationary contact members, and one or more dynamic or movable contact members that are adapted to contact the substrate and bend the substrate in a desired direction to reduce or eliminate bowing of the substrate. The mechanism is controlled by a CPU or other controller that can adjust the de-bow parameters of the de-bowing mechanism based on input settings that can be dynamic and/or static settings. The mechanism can be used to de-bow a variety of substrates including plastic cards, passports, and passport pages.

23 Claims, 13 Drawing Sheets

(56) References Cited

U.S. PATENT DOCUMENTS

| | | | |
|---|---|---|---|
| 5,266,781 A | 11/1993 | Warwick et al. | |
| 5,478,428 A * | 12/1995 | Carpenter | B29C 63/0013 156/719 |
| 5,520,776 A * | 5/1996 | Van Allen | B29C 63/0013 156/715 |
| 5,656,127 A * | 8/1997 | De Niel | B29C 63/0013 156/714 |
| 5,729,000 A | 3/1998 | Sugimoto | |
| 6,095,220 A | 8/2000 | Kobayashi et al. | |
| 6,250,552 B1 | 6/2001 | Hirasawa | |
| 6,352,095 B1 | 3/2002 | Fulmer et al. | |
| 6,473,592 B2 * | 10/2002 | Nishio | B65H 29/12 399/406 |
| 6,659,348 B2 | 12/2003 | Nagata et al. | |
| 6,783,067 B2 | 8/2004 | Kreuter et al. | |
| 6,902,107 B2 | 6/2005 | Shay et al. | |
| 7,398,972 B2 | 7/2008 | Schuller et al. | |
| 7,434,728 B2 | 10/2008 | Paulson et al. | |
| 7,784,700 B2 | 8/2010 | Galles et al. | |
| 2001/0017318 A1 | 8/2001 | Nagata et al. | |
| 2002/0134516 A1 | 9/2002 | Ashley et al. | |
| 2003/0188831 A1 | 10/2003 | Sasaki et al. | |
| 2003/0201330 A1 | 10/2003 | Nagata et al. | |
| 2007/0102518 A1 | 5/2007 | Galles et al. | |
| 2009/0097955 A1 | 4/2009 | Francis et al. | |
| 2009/0190983 A1 * | 7/2009 | Yamamoto | B65H 29/12 399/406 |
| 2013/0220984 A1 | 8/2013 | Cronin et al. | |

FOREIGN PATENT DOCUMENTS

| | | |
|---|---|---|
| JP | 63-262227 | 10/1988 |
| JP | 02078549 | 3/1990 |
| JP | 2001225992 | 8/2001 |
| JP | 2001-253621 | 9/2001 |
| JP | 2003-302798 | 10/2003 |

* cited by examiner

CARD DE-BOWING MECHANISM

FIELD

The technical disclosure herein relates to reducing bowing effects associated with the processing of substrates, including personalized documents such as plastic cards including but not limited to financial (e.g. credit and debit) cards, drivers' licenses, national identification cards, and other cards which bear personalized data unique to the card holder and/or which bear other card or document information, as well as to passports or passport pages. Particularly, the technical disclosure herein relates to reducing bowing effects associated with heat lamination and other heat transfer processes which effects may occur during processing of such personalized documents.

BACKGROUND

Document processing systems and methods used in producing personalized cards and other personalized documents have been employed by institutions that issue such documents. Identity documents, which are often personalized by such systems and methods, include plastic and composite cards, for instance financial (e.g. credit and debit) cards, drivers' licenses, national identification cards, and other cards and documents, such as passports, which are personalized with information unique to the intended document holder.

Document processing systems can be designed for relatively small scale, individual document personalization and production. In these systems, a single document to be personalized is input into a processing machine, which typically includes one or two personalization/processing capabilities, such as printing and laminating. These processing machines are often termed desktop processing machines because they have a relatively small footprint intended to permit the processing machine to reside on a desktop. Many examples of desktop processing machines are known, such as the SD or SP family of desktop card printers available from DataCard Corporation of Minnetonka, Minn. Other examples of desktop processing machines are disclosed in U.S. Pat. Nos. 7,434,728 and 7,398,972, each of which is incorporated herein by reference in its entirety.

For large volume batch production of personalized documents, institutions often utilize systems that employ multiple processing stations or modules to process multiple documents at the same time to reduce the overall per document processing time. Examples of such systems are disclosed in U.S. Pat. Nos. 4,825,054, 5,266,781 and its progeny, U.S. Pat. Nos. 6,783,067, and 6,902,107, all of which are incorporated herein by reference in their entirety. As with desktop document processing machines, batch processing systems also include printing and laminating capabilities.

Some processing operations in these systems or machines, however, may produce undesired bowing effects in a document. That is, a bend may occur in the document as a result of the processing operation(s) performed on the document. Particularly, this bowing problem can occur as a result of heat lamination of the document and other heat transfer operations that, when performed, may create a bow or bend in the document.

One technique for de-bowing personalized cards is described in U.S. Pat. No. 7,784,700.

SUMMARY

Generally, the present technical disclosure describes a mechanism, system and method for de-bowing a substrate in general. The substrate can be any substrate that is bowed and for which one wishes to eliminate or reduce the bow. One specific substrate that can benefit from this technical disclosure is a personalized documents such as plastic cards including but not limited to financial (e.g. credit and debit) cards, drivers' licenses, national identification cards, gift cards, loyalty cards, employee badges, and other plastic cards which bear personalized data unique to the card holder and/or which bear other card or document information, as well as to passports or passport pages.

In an embodiment, the substrate is de-bowed after the substrate has undergone heat lamination or other heat transfer operation(s). In the case of personalized documents, the de-bowing occurs after the document has been laminated on one or both surfaces of the document. Any number of other document processing steps can occur prior to and/or after lamination, such as printing, magnetic strip programming, chip programming, embossing, indenting, and others known to those having ordinary skill in the art.

A substrate de-bowing mechanisms as described herein can include a substrate support, one or more stationary contact members, and one or more dynamic or movable contact members that are adapted to contact the substrate and bend the substrate in a desired direction to reduce or eliminate bowing of the substrate.

In an embodiment, a substrate de-bowing mechanism includes a substrate support having a substrate travel path, and a first, stationary substrate contact member mounted on the substrate support and positioned to engage a surface of a substrate during de-bowing. A first, movable substrate contact member is rotatably mounted on the substrate support for rotation about a rotation axis, and the first, movable substrate contact member is rotatable between a first home position that is on one side of the substrate travel path to permit engagement of the first, movable substrate contact member with a first surface of the substrate and a second home position that is on a second, opposite side of the substrate travel path to permit engagement of the first, movable substrate contact member with a second surface of the substrate.

In another embodiment, a substrate de-bowing mechanism includes a substrate support having a substrate transport direction and a substrate travel path. A first intermediate substrate contact member and a second intermediate substrate contact member are mounted on the substrate support, with the first intermediate substrate contact member disposed opposite of and facing the second intermediate substrate contact member. A nip is defined between the first intermediate substrate contact member and the second intermediate substrate contact member that receives a substrate to be de-bowed so that the first intermediate substrate contact member contacts a first side surface of the substrate and the second intermediate substrate contact member contacts a second side surface of the substrate. In addition, a first end substrate contact member and a second end substrate contact member are mounted on the substrate support, with the first end substrate contact member disposed on a first axial side of the first and second intermediate substrate contact members and the second end substrate contact member disposed on a second axial side of the first and second intermediate substrate contact members, and the first and second intermediate substrate contact members are located between the first and second end substrate contact members. The first and second end substrate contact members are rotatable about respective rotation axes, and the rotation axes are located axially between the first and second end substrate contact members.

Further, the construction of the mechanism results in a reduced axial footprint (i.e. the axial size) of the mechanism.

For example, the axial footprint or distance can be defined as the distance between the first and second end substrate contact members when the members are at the first home position. That axial footprint or axial distance can be equal to or less than the length of the substrate, for example a plastic card, to be de-bowed.

In another embodiment, a substrate processing system includes the substrate de-bowing mechanism. In one embodiment, the substrate processing system is a desktop card or passport processing machine or a central card or passport issuance system.

In an embodiment, a substrate processing system includes a substrate transport mechanism that transports a substrate having a length L through the substrate processing system in a substrate transport direction along a substrate travel path. A lamination mechanism is disposed along the substrate travel path, with the lamination mechanism configured to apply a laminate to the substrate. A substrate de-bowing mechanism is disposed along the substrate travel path, and the substrate de-bowing mechanism has an axial footprint, measured between a pair of movable card contact members at a first home position and that are used to de-bow the substrate, that is equal to or less than the length L.

In an embodiment, a method of de-bowing a substrate includes inserting a substrate to be de-bowed onto a substrate support having a substrate travel path so that a first, stationary substrate contact member is engaged with a first side surface of the substrate. A first, movable substrate contact member is then engaged with a second side surface of the substrate, and the first, movable substrate contact member is rotated about a rotation axis to cause the substrate to bend about the first, stationary substrate contact member.

In still another embodiment, a method of de-bowing a substrate includes inserting a substrate to be de-bowed into a nip between a first intermediate substrate contact member and a second intermediate substrate contact member so that the first intermediate substrate contact member contacts a first side surface of the substrate and the second intermediate substrate contact member contacts a second side surface of the substrate approximate a center of the substrate. A first end substrate contact member and a second end substrate contact member are then engaged with the first side surface of the substrate, with the first end substrate contact member engaging the first side surface adjacent to a first end of the substrate and the second end substrate contact member engaging the first side surface adjacent to a second end of the substrate. Thereafter, the first end substrate contact member and the second end substrate contact member are rotated in opposite directions to cause the substrate to bend about the second intermediate substrate contact member.

In another embodiment, a system includes a substrate transport mechanism, a lamination mechanism, a substrate de-bowing mechanism, and a CPU or controller that controls the de-bowing mechanism, where the CPU or controller adjusts de-bow parameters of the de-bowing mechanism based on input settings. The input setting can be, for example, pre-programmed, and/or modified based on dynamic and/or static settings, and/or modified based on data provided by detection means that detect the direction and/or amount of bowing of a substrate.

In one embodiment, the substrate can be heated to help remove the bow in the substrate. The heating can occur immediately prior to the substrate reaching the de-bowing mechanism or the heating can occur after the substrate has reached the de-bowing mechanism.

In another embodiment, means for detecting bowing in the substrate can be provided. The means for detecting can detect the direction (i.e. upward or downward) and/or the magnitude of the bowing. The means for detecting can be incorporating into the de-bowing mechanism or be positioned upstream of the de-bowing mechanism.

DRAWINGS

DETAILED DESCRIPTION

Substrate de-bowing mechanisms as described in further detail below can include a substrate support, one or more stationary contact members, and one or more dynamic or movable contact members that are adapted to contact the substrate and bend the substrate in a desired direction to reduce or eliminate bowing of the substrate.

As used herein, the term "stationary" as in "stationary contact member" or the like, or "fixed" as in "fixed contact member" or the like, means that the contact member does not move in order to cause de-bowing. However, the "stationary" or "fixed" contact member could rotate about its own axis or otherwise move in a manner that is incidental to the bending of the substrate.

In an embodiment, the de-bowing mechanism can further include a substrate transport mechanism that facilitates movement of a substrate into and out of the substrate support.

In an embodiment, the dynamic contact member(s) can be an end contact member(s) adapted to contact a portion(s) of the substrate at or near the end(s) of the substrate.

In an embodiment, the dynamic contact members are rotatable about respective rotation axes, which allows the dynamic contact members to be set in different home positions (i.e. above or below the substrate travel path) in order to facilitate contact with either a first surface or a second surface of the substrate. This allows the same mechanism to de-bow substrates that have either a concave bowing or convex bowing.

The rotational aspect of the dynamic contact members can also reduce the footprint of the de-bowing mechanism so that the footprint has a length that is less than the length of the substrate.

The de-bowing mechanism can be controlled by either an independent controller or by part of a system controller. The motion profile and other aspects of the de-bowing mechanism can be pre-programmed, modified based on dynamic and/or static settings, or modified based on data provided by detection means that detect the direction and/or amount of bowing of a substrate.

Figure 1B:
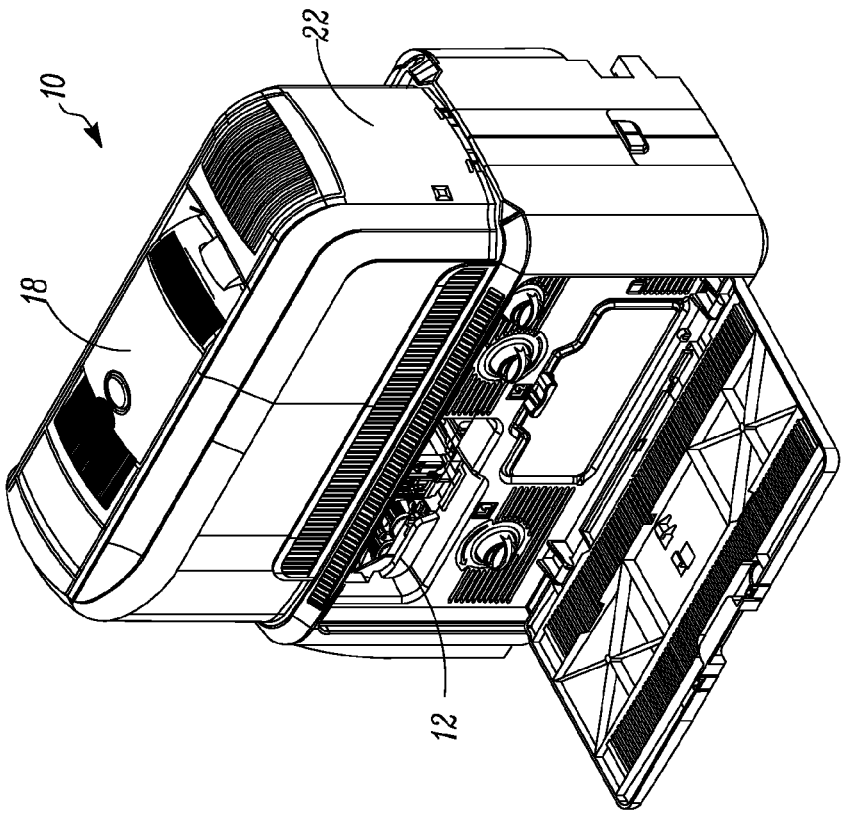
FIGS. 1A and 1B illustrate an example of a substrate processing system in the form of a desktop card processing machine.
Figure 1A:
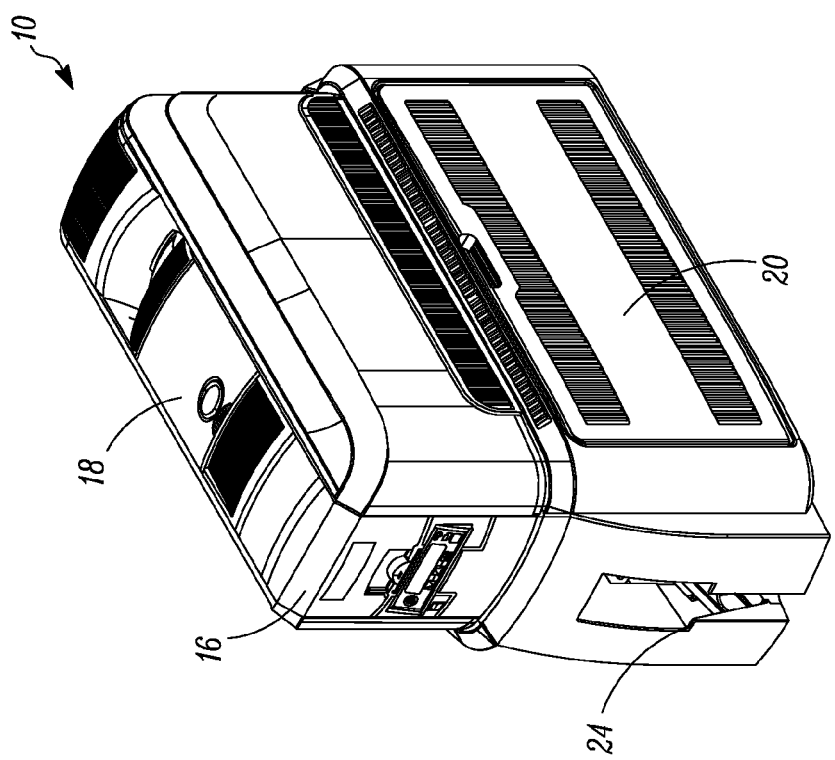

With reference initially to FIGS. 1A and 1B, a substrate processing system 10 that incorporates a substrate de-bowing mechanism 12 is illustrated. The system 10 can be any system that handles substrates 14 that are bowed or become bowed during processing in the system 10. The substrate 14 can be any substrate that is or becomes bowed in the system 10 and for which one wishes to eliminate or reduce the bow.

To facilitate the explanation, the system 10 will be described as a personalized document processing system, in particular a desktop card processing machine, and the substrate 14 will be described as a personalized document such as a plastic card including but not limited to financial (e.g. credit and debit) cards, drivers' licenses, national identification cards, gift cards, loyalty cards, employee badges, and other plastic cards which bear personalized data unique to the card holder and/or which bear other card or document information, as well as to passports or passport pages. Therefore, the de-bowing mechanism 12 will also be described as being a personalized document de-bowing mechanism. However, it is to be realized that the system and substrate are not limited to personalized documents or to desktop card processing machines.

In FIGS. 1A and 1B, the desktop card processing machine includes an input 16 that can hold a plurality of plastic cards 14 to be processed and that mechanically feeds the cards one-by-one into the machine for processing. In the illustrated example, the cards are initially fed into a printer 18 that prints on the cards. After printing, the cards are mechanically transported to a lamination mechanism 20 which applies a laminate(s) to one or both surfaces of the cards. The cards are then transported to the de-bowing mechanism 12 which removes or reduces any bowing that occurs in the card resulting from the lamination process. In some embodiments, the cards, after the de-bowing process, satisfy ISO 7810 Section 8.1.11, which is hereby incorporated by reference herein in its entirety.

After de-bowing, the card can be fed into one or more further processing mechanisms, for example an indenting mechanism 22 which performs indenting on the cards and the cards are then discharged into an output 24. Alternatively, the cards can be transported directly from the de-bowing mechanism into an output.

Figure 2B:
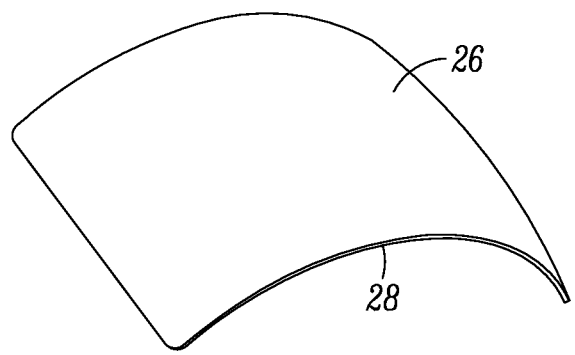
FIGS. 2A, 2B and 2C are a top view, a perspective view showing convex bowing, and a perspective view showing concave bowing, respectively, of a plastic card substrate.
Figure 2A:
Figure 2C:
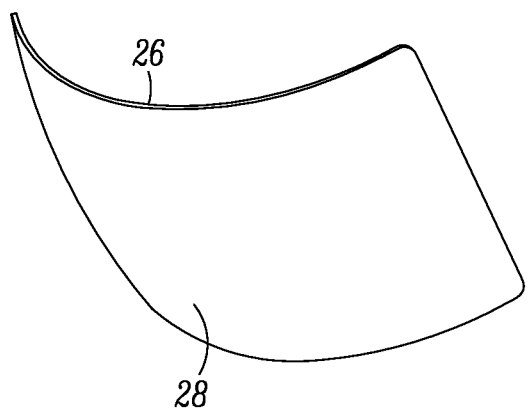

FIGS. 2A-C illustrate an example of the plastic card 14. In this example, the card 14 is generally rectangular in construction with a first or upper surface 26 and a second or lower surface 28. The terms "upper" and "lower" as used herein are relative to the orientation of the card depicted in FIGS. 2A-C. In the examples described herein, it will be assumed that the cards 14 travel through the desktop card processing machine in the flat or planar orientation illustrated in FIG. 2A with the first surface 26 facing upward and the second surface 28 facing downward, and in a direction of the longitudinal axis of the card between a leading edge 30 and a trailing edge 32. In one embodiment, the card can have nominal ID-1 card dimensions of 2.125×3.370 inches. The cards can be made of plastic material(s) or made of any material(s) susceptible to bowing. However, the cards can have other card shapes, sizes and materials.

As a result of the processing that occurs on the card 14, particularly the lamination process, the card 14 can become bowed. The bowing can occur in an upward direction (e.g. convex bowing) as indicated in FIG. 2B or the bowing can occur in a downward direction (e.g. concave bowing) as indicated FIG. 2C, depending upon factors such as which surface 26, 28 has been laminated.

Figure 2D:
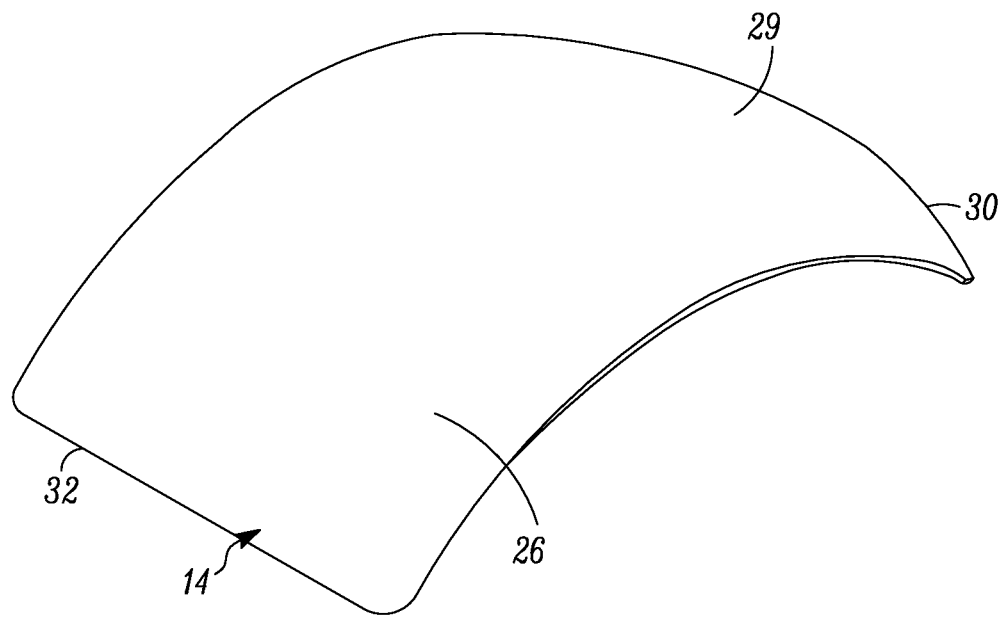
FIG. 2D is a perspective view of a plastic card substrate with two dimensional bowing.

Two-dimensional bowing can also occur on the card 14. For example, with reference to FIG. 2D, the card 14 is shown as being convexly bowed generally between the leading edge 30 and the trailing edge 32. The card 14 is also convexly bowed at location 29 between side edges of the card 14.

In addition, the cards 14 travel into, through and from the de-bowing mechanism 12 in a substrate transport direction X-X from the leading edge 30 to the trailing edge 32 along a substrate travel path which is generally a plane defined by the card. In an embodiment, the transport direction X-X is one-way so that the cards travel in a single direction. In another embodiment, the transport direction X-X is two-way so that the cards can travel in a forward and reverse direction in the de-bowing mechanism 12, as well as optionally in other processing mechanisms of the system 10.

Figure 3:
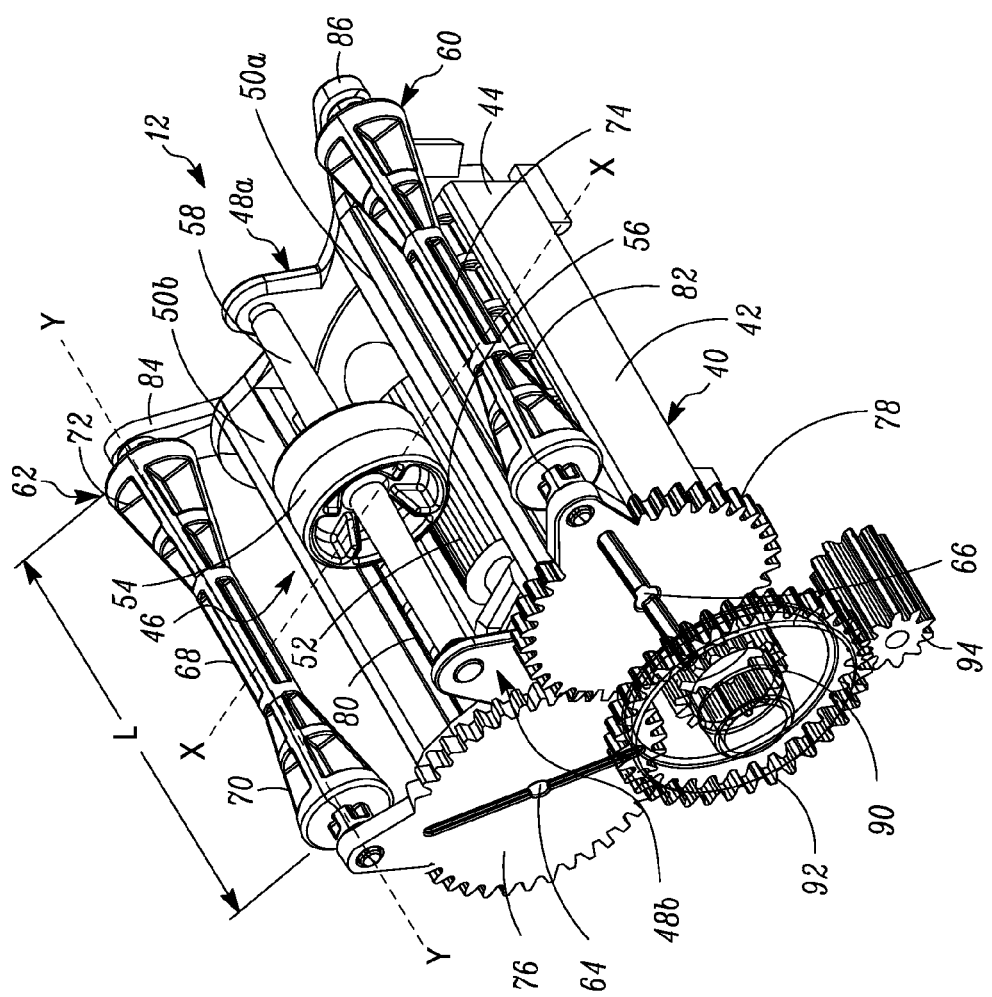
FIG. 3 is a perspective view of one embodiment of a substrate de-bowing mechanism described herein.

Turning now to FIG. 3, one embodiment of the de-bowing mechanism 12 will now be described. The mechanism 12 includes a substrate support 40 that is configured to support a card during a de-bowing operation. The support 40 has the transport direction X-X therethrough and a substrate travel path such that in the orientation illustrated in FIG. 3, the card is oriented generally horizontally with the first surface 26 facing upward and the second surface 28 facing downward.

The support 40 can have any configuration that is suitable for supporting the card during de-bowing. For example, the support 40 can comprise a generally rectangular plate 42 having a front or substrate input end 44 and a rear or substrate output end 46. A pair of flanges 48a, 48b extend upwardly from sides of the plate 42 and extend substantially from the front end 44 to the rear end 46. Bars 50a, 50b extend between the flanges 48a, 48b to help stiffen the plate 42.

A drive roller 52 is rotatably mounted on the plate 42. An idler roller 54 is also mounted on the plate 42 opposite of and facing the roller 52. A nip 56 is defined between the roller 52, 54 for receiving the card therebetween. Therefore, the substrate travel path extends through the nip 56. The rollers 52, 54 are fixed relative to one another such that the rollers 52, 54 are not movable toward each other. In other embodiments, the drive roller 52 does not necessarily need to be positioned opposite the idle roller 54.

The drive roller 52 is in driving engagement with a drive motor (not shown) for driving the roller 52. The roller 52 is used to drive the card into and from the mechanism 12. The drive motor can be any type of motor known in the art that is suitable for driving the roller 52, and the drive motor can drive the roller in one direction or the motor can be reversible to drive the roller in both directions. However, other card transport mechanisms could be used, for example a transport mechanism that moves the card by contacting the edges of the card as described in U.S. patent application Ser. No. 13/773, 753, filed on Feb. 22, 2013, which is incorporated herein by reference in its entirety.

The idler roller 54 is rotatably mounted on a shaft 58 that extends between the flanges 48a, 48b. The idler roller 54 rolls along the surface of the card opposite the surface engaged by the drive roller 52.

In the illustrated example, the drive roller 52 forms a first intermediate, stationary substrate contact member and the idler roller 54 forms a second intermediate, stationary substrate contact member. When a card is received in the nip 56, the drive roller 52 contacts the first side surface 26 of the card and the idler roller 54 contacts the second side surface 28 of the card. However, other designs are possible, including designs where a single intermediate substrate contact member is utilized.

The mechanism 12 also includes a first end substrate contact member 60 and a second end substrate contact member 62 mounted on the substrate support 40. The substrate contact members 60, 62 are designed to engage one of the surfaces 26, 28 of the card to bend the card about either the drive roller 52 (i.e. when bending the card downwardly) or the idler roller 54 (i.e. when bending the card upwardly).

Taking the transport direction X-X as the axial direction, the first end substrate contact member 60 is disposed on a first axial side of the first and second intermediate substrate contact members 52, 54 and the second end substrate contact member 62 is disposed on a second axial side of the first and second intermediate substrate contact members 52, 54. In other words, the rollers 53, 54 are located between the first and second end substrate contact members 60, 62. The first and second end substrate contact members 60, 62 are each rotatable about respective rotation axes 64, 66 that are perpendicular to the substrate transport direction X-X and that are located axially between the first and second end substrate contact members 60, 62.

In the illustrated example, the substrate contact members 60, 62 are generally similar in construction to one another, but they are rotatable in opposite directions to one another during a bending operation. In particular, each of the contact members 60, 62 includes a single contact member in the form of a rotatable roller 68 having a first end 70, a second end 72, and a length L between the first end and the second end. Each roller 68 is rotatable about its longitudinal axis Y-Y perpendicular to the card transport direction X-X.

The first end 70 has a generally frustoconical shape that extends or downwardly tapers toward the second end 72. Likewise, the second end 72 has a frustoconical shape that extends or tapers downwardly toward the first end 70. A section 74 of constant dimension interconnects the small diameter ends of the frustoconical ends 70, 72. The length L of each roller 68 is equal to or greater than a height of the substrate to be de-bowed. For example, with reference to FIG. 2A, the height of the card substrate is defined as the straight-line distance between the side edges 31, 33.

With continued reference to FIG. 3, the first ends 70 of the rollers 68 are each connected to drive gears 76, 78 that are rotatably mounted on the support 40 for rotation about the axes 64, 66. In addition, shafts 80, 82 are connected to the gears 66, 68 and are supported on the support 40. The shafts 80, 82 extend across the support and through the flange 48a where the ends of the shafts are connected to arms 84, 86 that are fixed to the second ends 72 of the rollers 68. As should be apparent, when the gears 76, 78 rotate, the rotation is transmitted to both ends of the rollers 68 to rotate the rollers 68 about the axes 64, 66.

In the embodiment in FIG. 3, the gears 76, 78 are meshed with each other, and one of the gears, for example the gear 78, is engaged with a drive gear 90 which is driven by a gear 92 and a gear 94. The gear 88 is driven by a drive mechanism, such as a reversible electric motor (not shown). When the gear 88 is rotated, the gears 76, 78 are rotated in opposite directions so that the rollers 68 are moved either away from each other (i.e. in a downward direction) or mover toward each other (i.e. in an upward direction), depending upon the direction of rotation of the gear 94.

Figure 11:
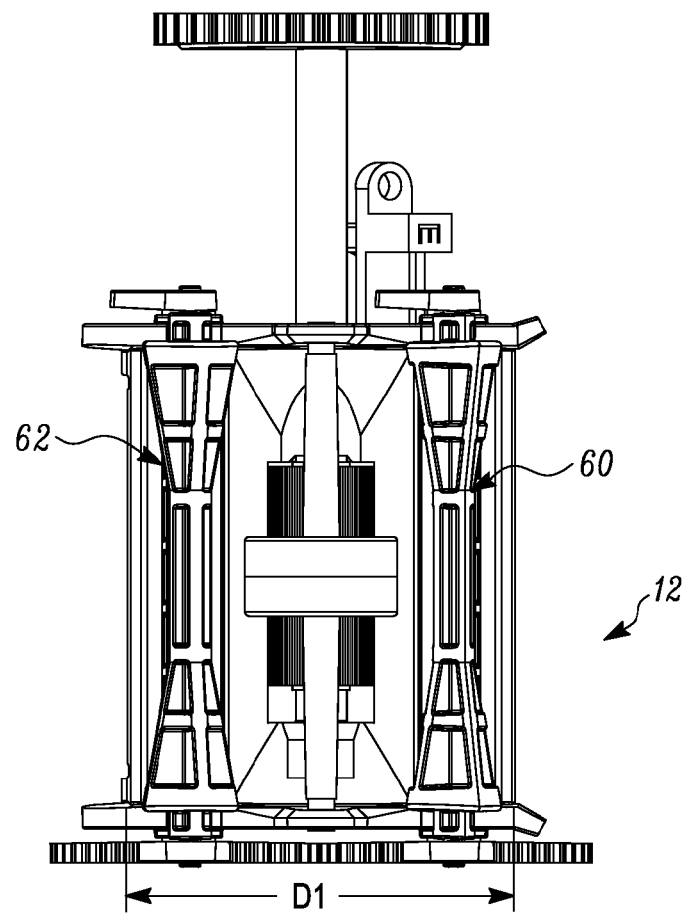
FIG. 11 is a top view of the de-bowing mechanism and a plastic card substrate demonstrating the axial footprint of the de-bowing mechanism.
Figure 11:

In order to be able to bend the substrate upwardly or downwardly, the first and second end substrate contact members 60, 62 are rotatable between a first home position (shown in FIG. 11) where the first and second end substrate contact members are positioned on one side of the travel path (i.e. above the nip 56) to permit the first and second end substrate contact members to contact the first side surface 26 of the substrate, and a second home position (not shown) where the first and second end substrate contact members 60, 62 are positioned on an opposite side of the substrate travel path (i.e. below the nip 56) to permit the first and second end substrate contact members to contact the second side surface 28 of the substrate.

Further, the construction of the mechanism 12 results in a reduced axial footprint (i.e. the axial size) of the mechanism 12. For example, with reference to FIG. 11, an axial distance D1 between the first and second end card contact members 60, 62 when the members 60, 62 are at the first home position is equal to or less than the length D2 of the substrate to be de-bowed. In one embodiment, the axial distance D1 or footprint can be less than approximately 80 percent of the length D2 of the substrate, for example a plastic card. In another embodiment, the axial distance D1 or footprint can be less than approximately 75 percent of the length D2 of the substrate. In another embodiment, the axial distance D1 or footprint can be less than approximately 65 percent of the length D2 of the substrate.

Figure 6:
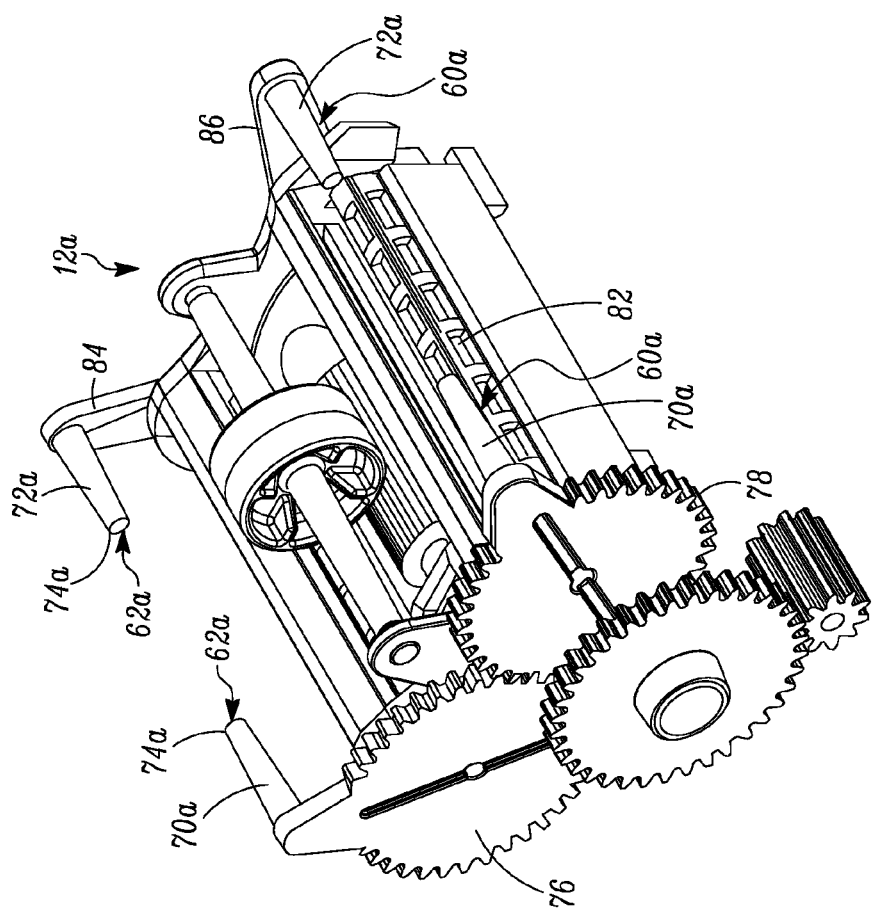
FIG. 6 is a perspective view of another embodiment of a substrate de-bowing mechanism described herein.

With reference to FIG. 6, an embodiment of a de-bowing mechanism 12a is illustrated that is similar to the de-bowing mechanism 12 with like elements referenced using the same reference numerals. One way in that the embodiment in FIG. 6 differs is that instead of a single continuous contact member as used in FIG. 3, the de-bowing mechanism 12a includes a first end substrate contact member 60a and the second end substrate contact member 62a that each has first and second contact portions 70a, 72a that are not directly connected to one another. Each contact portion 70a has a first end fixed to the gear 76, 78, and a second free end 74a. Likewise, each contact portion 72a has a first end fixed to the arms 84, 86 and a second free end 74a. The first and second contact portions are frustoconical in shape and extend (i.e. taper) toward one another. In addition, the distance L from the first end of the first contact portion to the first end of the second contact portion is equal to or greater than a height of the substrate to be de-bowed.

Figure 7:
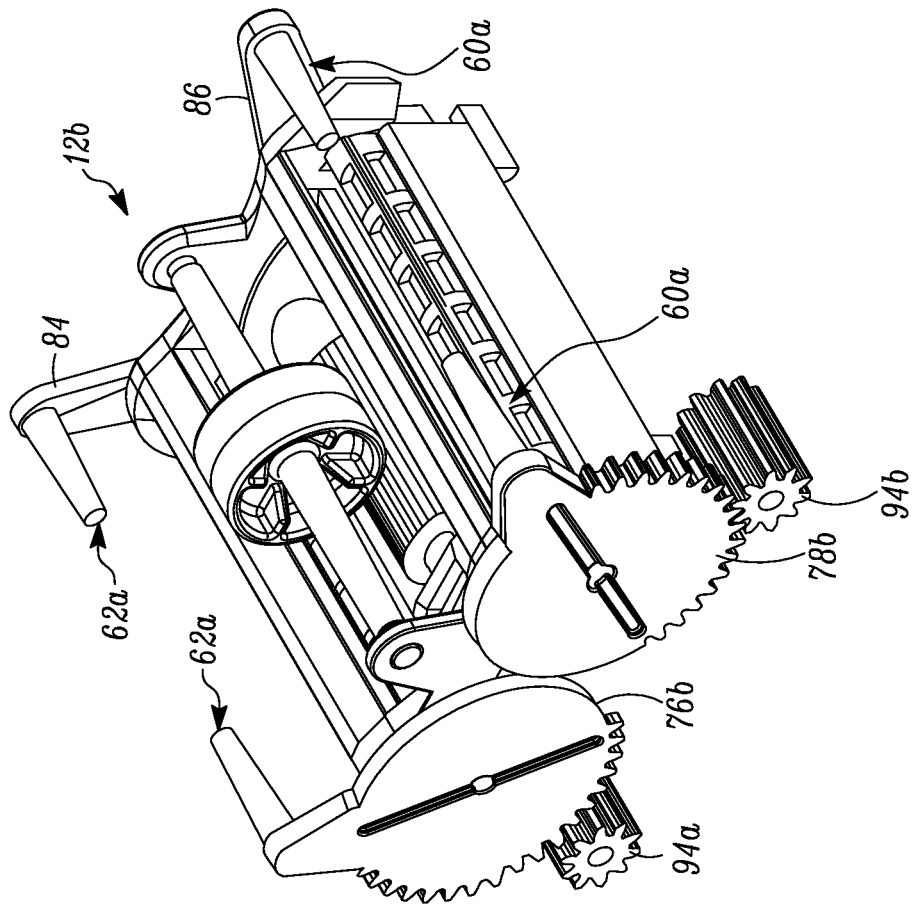
FIG. 7 is a perspective view of still another embodiment of a substrate de-bowing mechanism described herein.

In addition, in the de-bowing mechanism 12a, the first and second contact portions 70a, 72a are not rotatable about their longitudinal axes. Instead, the portions 70a, 72 are non-rotatably fixed to their support structures (i.e. the gears and the arms). However, in one embodiment, the contact portions 70a, 72a could rotate about their longitudinal axes FIG. 7 illustrates an embodiment of a de-bowing mechanism 12b that uses separate drive mechanisms to drive the end contact members of FIG. 6 (or FIG. 3). In particular, the drive gears 76b, 78b are separate from each other, and each is in driving engagement with a gear 94a, 94b. Each gear 94a, 94b is driven by its own drive motor which permits separate control of the de-bowing performed by each end contact member. Therefore, each drive train can be separately driven and used to de-bow either the whole substrate or partial substrate.

Figure 8:
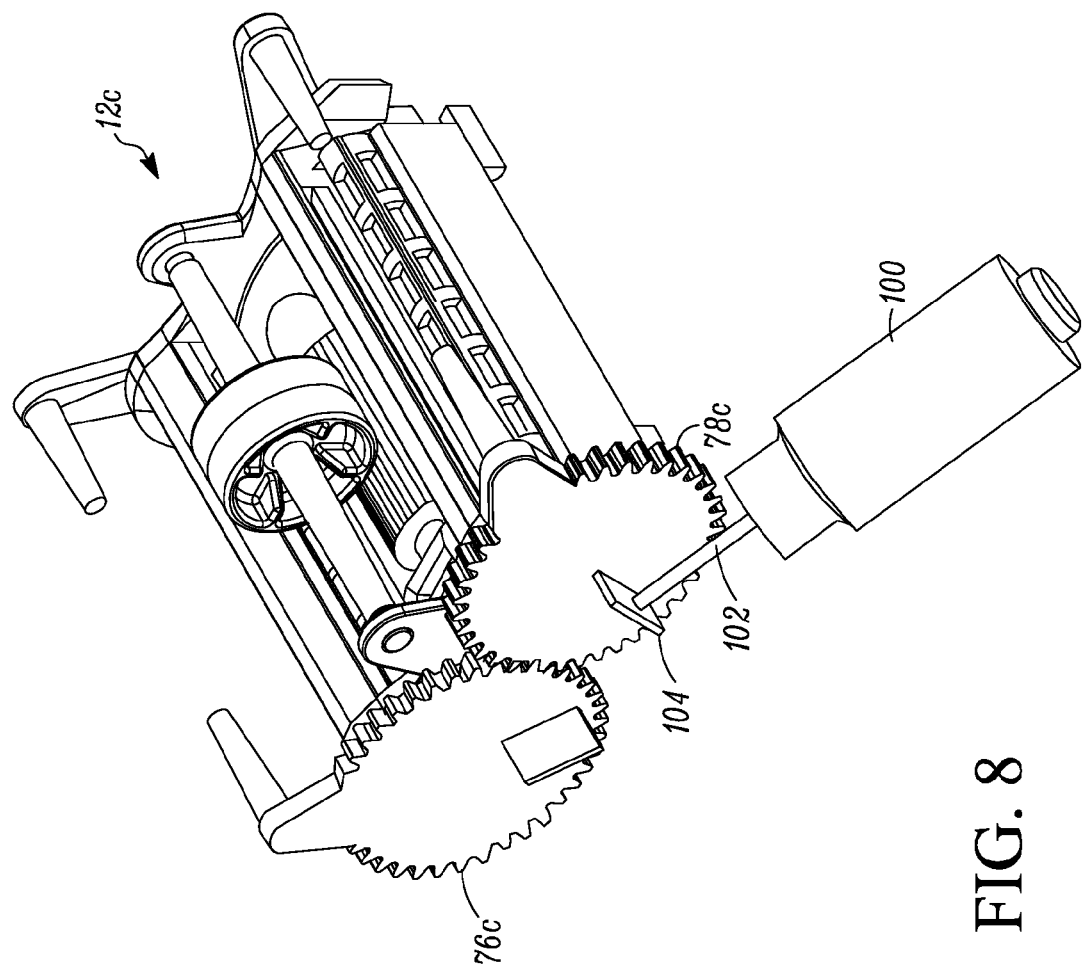
FIG. 8 is a perspective view of still another embodiment of a substrate de-bowing mechanism described herein.

FIG. 8 illustrates an embodiment of a de-bowing mechanism 12c that uses a solenoid drive mechanism to drive the end contact members of FIG. 6 (or FIG. 3). In particular, the drive gears 76c, 78c are engaged with each other as in FIG. 3. In addition, a solenoid 100 is provided that has an output shaft 102 that is engaged in a suitable manner with one of the gears 76c, 78c, for example the gear 78c, to convert linear motion of the shaft 102 into rotational motion of the gears 76c, 78c. In the illustrated example, the gear 78c includes a tab 104 projecting therefrom that is engaged with the shaft 102 such that when the shaft extends linearly, the gear 78c is rotated which simultaneously rotates the gear 76c. In another embodiment, the solenoid 100 is engaged with the gear 76c, or separate solenoids are engaged with each gear 76c, 78c similar to the separate drive mechanisms in FIG. 7. A biasing spring is provided at any suitable location in the drive train to bias the arms and the gears 76c, 78c back to the home position.

Means can also be provided for tracking the amount of rotational movement of the end substrate contact members to ensure a proper amount of de-bowing movement (i.e. depth of de-bowing). Any means for tracking movement to determine the depth of de-bowing, either of the mechanical parts or of the substrate itself, can be used. For example, the tracking means can be a photocell, a camera, a rotary encoder, or any other form of displacement sensor.

Figure 9:
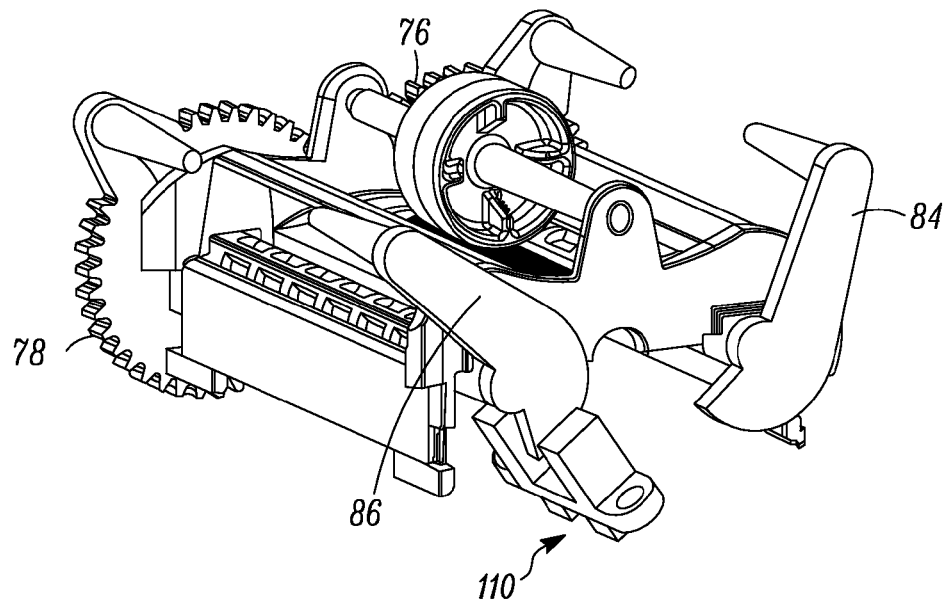
FIG. 9 is a perspective view of still another embodiment of a substrate de-bowing mechanism described herein.

For example, one embodiment of a rotational movement tracking means is illustrated in FIG. 9 in the form of a photocell mechanism 110 adjacent to the end of one of the arms, for example the arm 86, that detects the amount of movement of the arm. In the illustrated embodiment, the gears 76, 78 are connected to one another so that the arm 84 moves the same amount as the arm 86. Therefore, it is only necessary to track the movement of one of the arms 84, 86. However, if separate drive mechanisms are used as in FIG. 7, the movement of both of the arms can be separately tracked using separate photocell mechanisms or other mechanisms.

Figure 10:
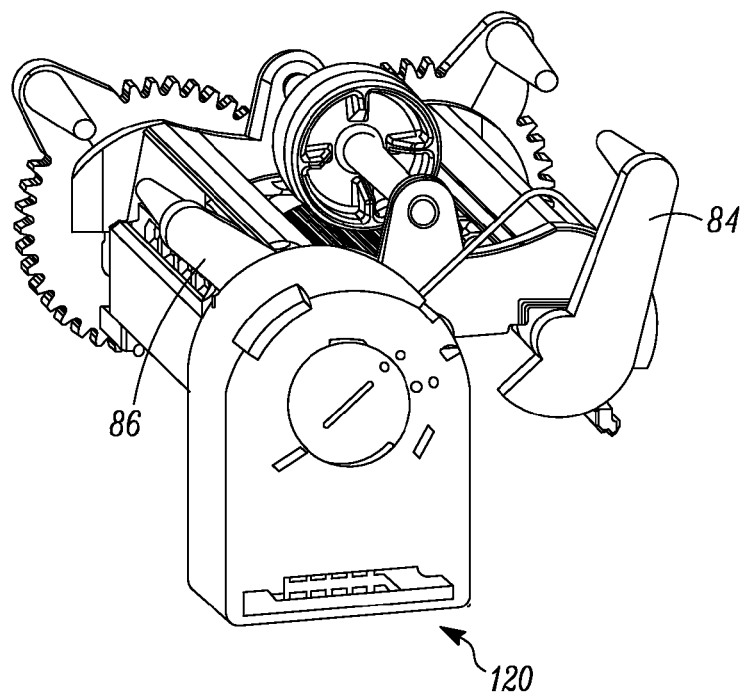
FIG. 10 is a perspective view of still another embodiment of a substrate de-bowing mechanism described herein.

Another embodiment of a rotational movement tracking means is illustrated in FIG. 10 in the form of a rotary encoder mechanism 120 connected to one of the arms, for example the arm 86. If separate drive mechanisms are used as in FIG. 7, a rotary encoder mechanism can be used on each arm.

Figure 4:
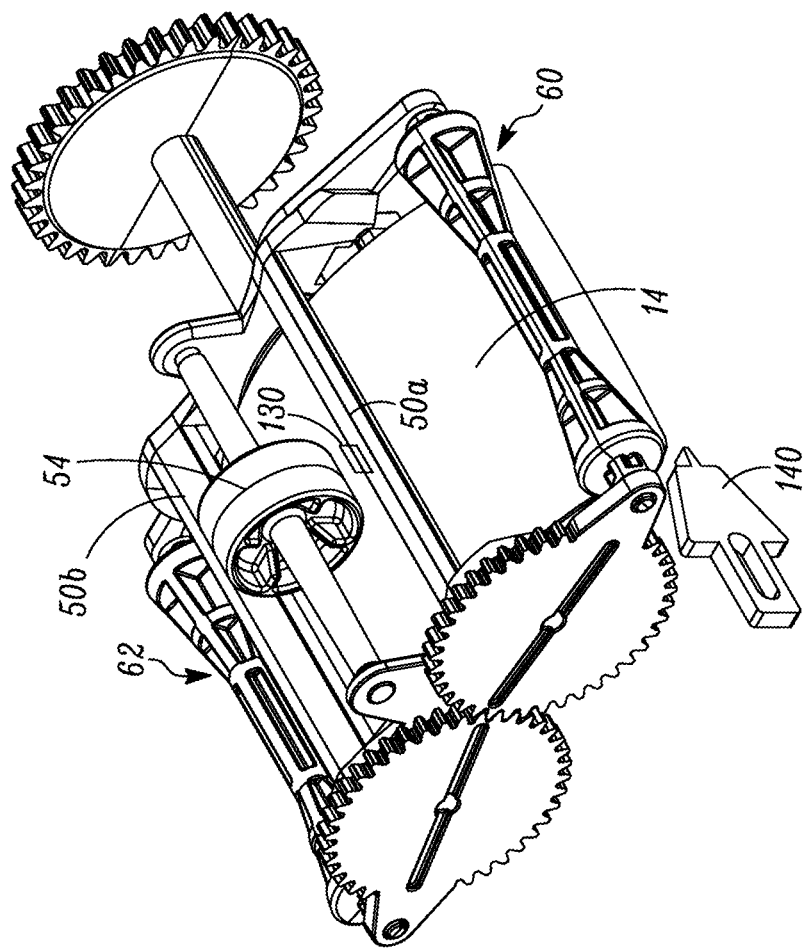
FIG. 4 is a perspective view of the de-bowing mechanism of FIG. 3 de-bowing a card downward.

FIG. 4 illustrates another example of detecting depth of de-bowing by using a sensor 140, for example a photocell, a camera, or other form of displacement sensor, that is positioned to detect the amount of movement of the substrate itself.

In one embodiment, the de-bowing can occur without any sensor feedback.

Figure 12:
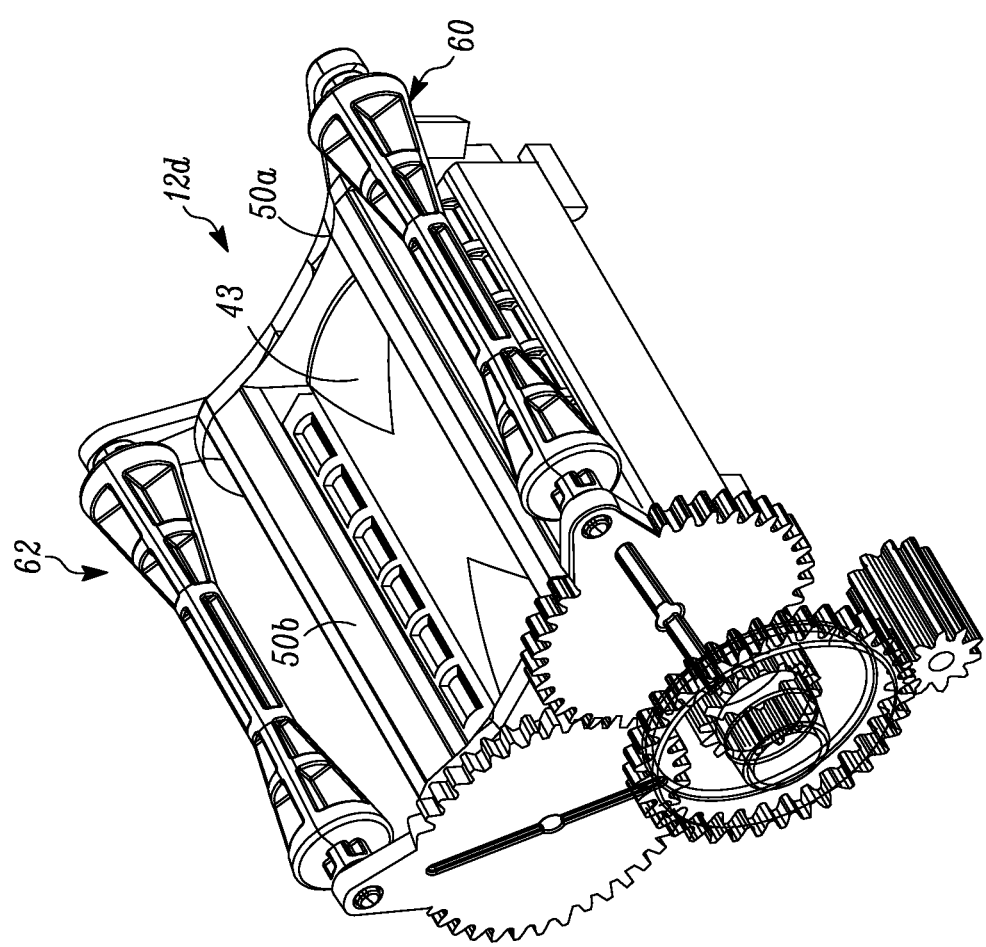
FIG. 12 illustrates an embodiment of a de-bowing mechanism without a card transport mechanism.

FIG. 12 illustrates another example of a de-bowing mechanism 12d that does not include a card transport mechanism. In this embodiment, the rollers 52, 54 described above are removed. Instead, the substrate is introduced into and removed from the de-bowing mechanism 12d using transport mechanisms of the processing machine located upstream and downstream of the de-bowing mechanism 12d. Alternatively, in one embodiment, the substrate is manually introduced into and removed from the de-bowing mechanism 12d. During a de-bowing operation, the substrate can bend around a central portion 43 of the plate 42 which forms a stationary contact member during downward de-bowing, or around the bars 50a, 50b during an upward de-bowing. The construction of the de-bowing mechanism 12d is otherwise as described above.

Figure 13:
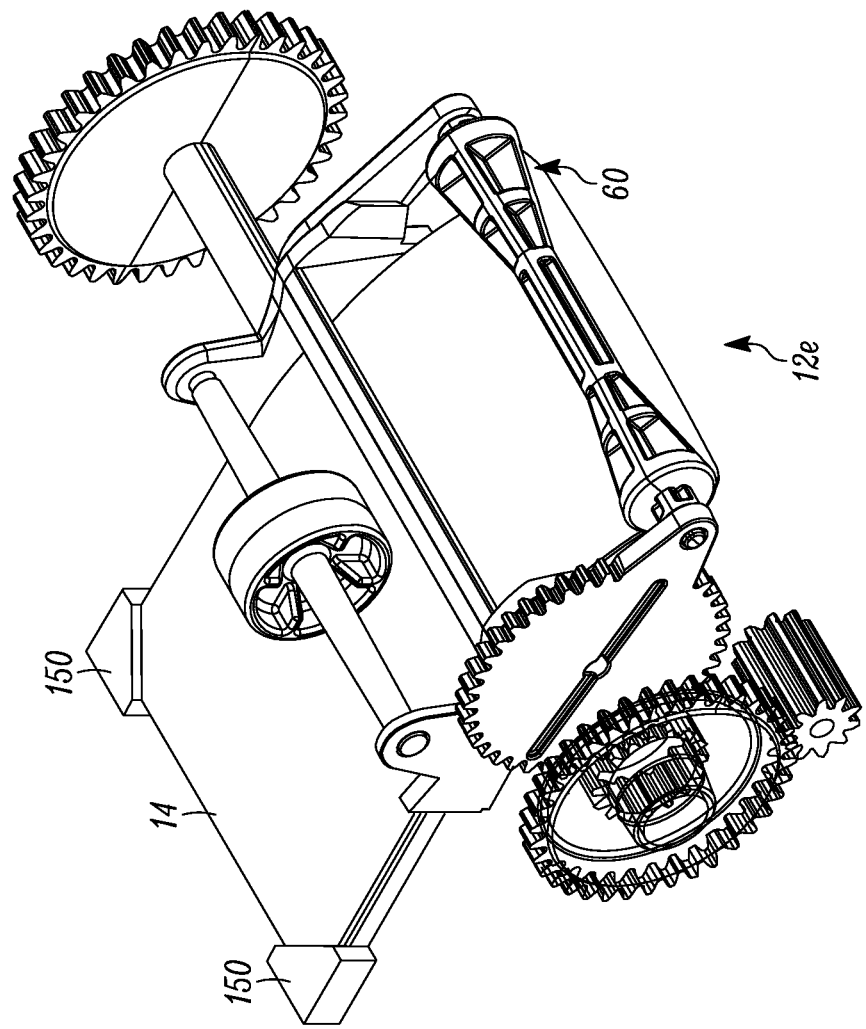
FIG. 13 illustrates an embodiment of a de-bowing mechanism that includes a single rotating substrate contact member.

FIG. 13 illustrates another example of a de-bowing mechanism 12e that includes a single rotating substrate contact member, for example the contact member 60. In this embodiment, the substrate support is suitably configured to support the end of the substrate opposite the contact member 60 to counter the bending force of the contact member. Any means for retaining the opposite end of the substrate can be used. In the example illustrated in FIG. 13, the substrate support includes one or more retainers 150 that hold opposite corners of the substrate while the substrate is de-bowed by movement of the contact member 60.

To aid in the de-bowing process, it may be useful to heat the substrate immediately prior to or during de-bowing so that the substrate has an elevated temperature during de-bowing. When heating of the substrate is desired, a means for heating the substrate can be provided. The heating means can take any form that is suitable for increasing the temperature of the substrate, and can be positioned at any location(s) for heating the substrate immediately prior to and/or during de-bowing. For example, in one embodiment, the drive roller 52 can be heated in order to transfer heat into the substrate. In another embodiment, the idler roller 54 is heated, or both of the rollers 52, 54 can be heated.

In another embodiment, illustrated diagrammatically in FIG. 4, a heated air discharge 130 can be mounted on the mechanism 12 to blow heated air onto the substrate 14 while the substrate is in the mechanism 12 to increase the temperature of the substrate. The heated air can be provided by a suitable fan mechanism mounted elsewhere in the system. In an alternative embodiment, the air discharge 130 can be mounted immediately upstream of the mechanism 12 to increase the temperature of the substrate immediately prior to the substrate being input into the mechanism 12 to be de-bowed.

In addition, it is sometimes useful to know both the direction of bowing (i.e. convex bow or concave bow) in the substrate as well as the amount of bowing. Knowing the amount of bowing allows one to adjust the de-bowing process to achieve the appropriate amount of de-bowing, and knowing the direction of bowing allows one to appropriately set the correct home positions of the end substrate contact members. Therefore, in an embodiment, a means for detecting bowing in the substrate can be provided. The means for detecting bowing can be located upstream of the de-bowing mechanism 12 to detect the direction and amount of bowing prior to the substrate entering the mechanism 12 and/or on the mechanism 12 to detect the direction and amount of bowing while the substrate is on the mechanism 12. If the means for detecting bowing is on the mechanism, it may be necessary to temporarily transport the substrate out of the mechanism once the direction of bowing is detected to permit change in the home position of the end substrate contact members.

The means for detecting bowing can take any form suitable for detecting the direction and/or amount of bowing in the substrate. In one example, the means for detecting bowing comprises a camera that captures one or more images of the substrate. The image(s) is then processed automatically in image processing software or manually by visual inspection to determine the direction and/or amount of bowing in the substrate.

The de-bow mechanism 12 can be controlled by either an independent controller or by a controller of the system 10. In one embodiment, the operation of the de-bowing mechanism 12 follows a pre-programmed sequence. This mode of operation is useful when parameters such as the direction of bowing, the amount of bowing, and the type of substrate being de-bowed are generally constant from one substrate to the next.

In another embodiment, the operation of the de-bowing mechanism 12 can be modified based on dynamic or static settings. The dynamic settings can be defined based on, among others, the following examples:

1. Defined/Calculated in the controller(s) based on, for example, logic, sensors, hardware, camera, or the like.

2. User Input that is defined as part of system setup, for example via a graphical user interface, a communication interface, system initializations, or the like.

3. Sent dynamically by an external interface as part of job (i.e. substrate) processing (single or batch substrate processing).

4. Defined by interfaces like RFID, ICODE, smart card chips, SD cards, encrypted storage devices or the like on supplies like a laminate supply, and/or on the substrate and/or on supply packaging.

5. Defined by a computed heuristic based on testing, experience, theory and the like.

The settings can include the following exemplary settings, among others:

1. Motion profile(s) for the drive motor(s) for the end substrate contact members.
2. A PID/PID profile for the drive motor(s)
3. A PID/PID profile for the substrate heater (if used).
4. Delays, dwell, displacement, frequencies, and the like for the drive motor(s).
5. Substrate materials including substrate types and laminate types, for example all/any card types, all/any card laminates, and all/any passport materials.
6. Ambient atmospheric conditions such as temperature, altitude, pressure, humidity, and the like.
7. Single sided lamination or dual sided lamination.
8. Number of de-bow cycles, including partial and/or full cycles and any combinations of de-bow cycles.

In one embodiment, the variable or dynamic settings can include the following exemplary settings, among others. In one embodiment, some or all of the variable settings can be automatically read via RFID from a supply or supply packaging and used to automatically adjust the operation, and/or some or all are input by a user.

Exemplary variable settings
Front Side Laminate type or presence (Patch, Topcoat, or the like)
Front Side Laminate application temperature
Back Side Laminate type or presence (Patch, Topcoat, or the like)
Back Side Laminate application temperature
Card or substrate Type (PVC, Polycarbonate, Passport booklet, or the like)
User Setting (More de-bow vs. Less de-bow)
Frontside lamination pressure
Rearside lamination pressure
Frontside lamination speed
Rearside lamination speed
Card temperature (if measured by a sensor)
Initial card bow (if measured by a sensor)
Lamination order (for example, front side of card first vs. back side first)
Heated roller type (aluminum roller; rubber coated roller; and the like)
Heated roller wattage
Partial patch/topcoat; full patch/topcoat on front and/or back In one embodiment, the static settings can include the following exemplary static settings, among others.

Exemplary Static Settings
Motor profile/acceleration curve
Displacement: how far the card is de-bowed which impacts the number of motor steps
Dwell time: how long the card is de-bowed before the mechanism lets go
Single impact or multi-impact.
De-bowing direction: does the card need to be de-bowed up or down In another embodiment, the temperature of the substrate can be measured prior to de-bowing and the setting dictating the amount of de-bowing is determined based on the detected substrate temperature.

In one exemplary operation of the mechanism 12, a method of de-bowing a substrate includes inserting the substrate to be de-bowed into the nip 56 between the first intermediate substrate contact member 52 and the second intermediate substrate contact member 54 so that the first intermediate substrate contact member contacts the first side surface 26 of the substrate and the second intermediate substrate contact member contacts the second side surface 28 of the substrate approximate a center of the substrate. The first end substrate contact member 60 and the second end substrate contact member 62 are then engaged with the first or second side surface of the substrate adjacent to the ends of the substrate depending upon when the substrate is to be de-bowed upwardly or downwardly. The first end substrate contact member and the second end substrate contact member are then rotated in opposite directions to cause the substrate to bend about either the first or second intermediate substrate contact member depending upon the direction of de-bowing.

In a specific exemplary operation of the mechanism 12, a substrate enters the mechanism. The motor(s) accelerates using a setting profile (discussed above) and drives the arms to a de-bow depth (discussed above). The depth can be measured by the photocell 110, the encoder 120, or by detecting deflection of the card itself. The motor(s) holds its position for a de-bow dwell time (discussed above), after which the motor(s) drives the arms back to their home position and the substrate exits.

Figure 5:
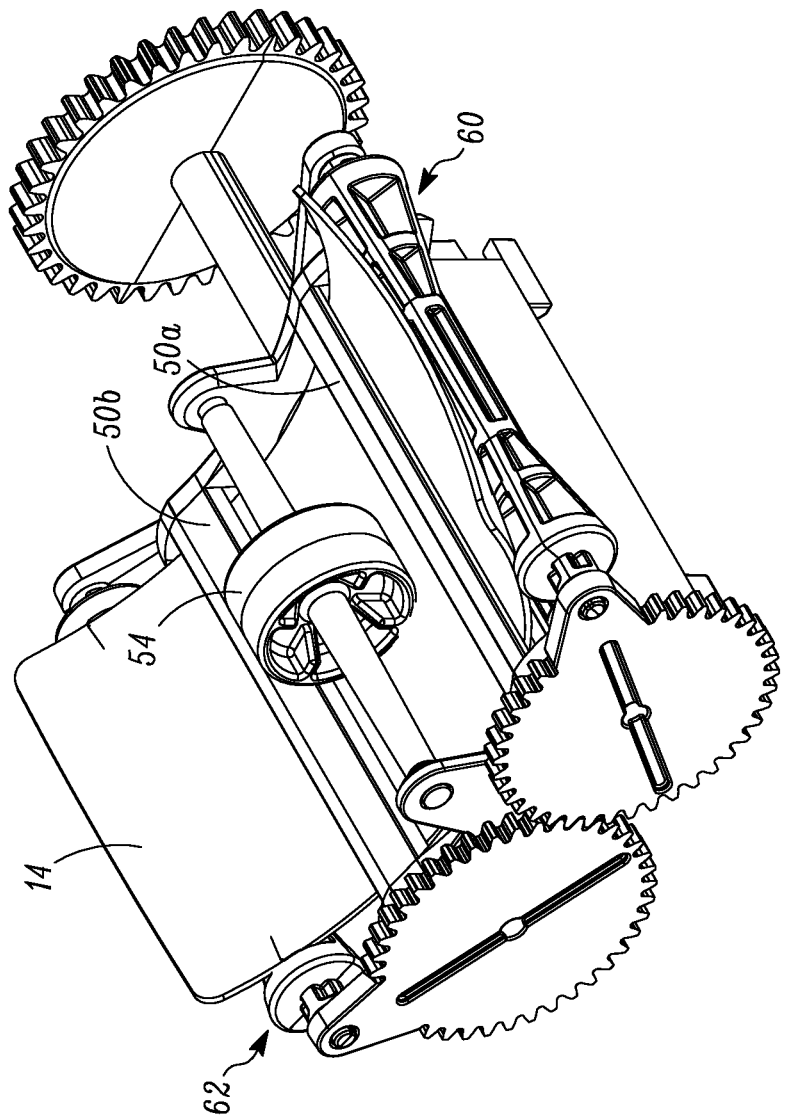
FIG. 5 is another perspective view of the de-bowing mechanism of FIG. 3 that is de-bowing a card upward.

Prior to inserting the substrate into the mechanism, the first end substrate contact member 60 and the second end substrate contact member 62 are brought to the appropriate home position depending upon the direction of de-bowing needed. For example, in the case of concave bowing 14b (see FIG. 2), the substrate needs to be de-bowed downwardly. Therefore, in this situation, the end substrate contact members 60, 62 are initially brought to the first home position so to bend the substrate downward about the drive roller 52 as shown in FIG. 4. In the case of convex bowing 14a (see FIG. 2), the substrate needs to be de-bowed upwardly. Therefore, in this situation, the end substrate contact members 60, 62 are initially brought to the second home position so to bend the substrate upward about the idler roller 54 as shown in FIG. 5

The direction of bowing and/or the amount of bowing can also be detected, such as prior to inserting the substrate into the mechanism and/or during the de-bowing process to determine if the bow has been removed and if not to implement another de-bowing cycle. Also, to aid in de-bowing the substrate, the substrate can be heated prior to de-bowing The embodiments disclosed in this application are to be considered in all respects as illustrative and not limitative. The scope of the claimed invention is indicated by any appended claims rather than by the foregoing description, and all changes which come within the meaning and range of equivalency of the claims are intended to be embraced therein.

The invention claimed is:

1. A substrate de-bowing mechanism, comprising:
a substrate support having a substrate travel path;
a first, stationary substrate contact member mounted on the substrate support and positioned to engage a surface of a substrate during de-bowing;

a first, movable substrate contact member rotatably mounted on the substrate support for rotation about a rotation axis, and the first, movable substrate contact member is rotatable between a first home position that is on one side of the substrate travel path to permit engagement of the first, movable substrate contact member with a first surface of the substrate and a second home position that is on a second, opposite side of the substrate travel path to permit engagement of the first, movable substrate contact member with a second surface of the substrates;

a second, movable substrate contact member rotatably mounted on the substrate support for rotation about a rotation axis, and the second, movable substrate contact member is rotatable between a first home position that is on the one side of the substrate travel path to permit engagement of the second, movable substrate contact member with the first surface of the substrate and a second home position that is on the second, opposite side of the substrate travel path to permit engagement of the second, movable substrate contact member with the second surface of the substrate;

the first, movable substrate contact member is disposed on a first axial side of the first, stationary substrate contact member and the second, movable substrate contact member is disposed on a second axial side of the first, stationary substrate contact member, and the first, stationary substrate contact member is located between the first and second movable substrate contact members; and the rotation axes of the first and second movable substrate contact members are located axially between the first and second movable substrate contact members, and the rotation axes are perpendicular to a substrate transport direction.

2. The substrate de-bowing mechanism of claim 1, further comprising:
a second, stationary substrate contact member mounted on the substrate support, the second, stationary substrate contact member is positioned relative to the first, stationary substrate contact member to engage a surface of a substrate during de-bowing that is opposite the surface engaged by the first, stationary substrate contact member.

3. The substrate de-bowing mechanism of claim 2, wherein the first, stationary substrate contact member is disposed opposite of and faces the second, stationary substrate contact member and define a nip therebetween.

4. The substrate de-bowing mechanism of claim 2, wherein the first, stationary substrate contact member comprises an idler roller, the second, stationary substrate contact member comprises a driven roller, and the first, stationary substrate contact member and the second, stationary substrate contact member are not movable toward each other.

5. The substrate de-bowing mechanism of claim 1, wherein the first, movable substrate contact member and the second, movable substrate contact member each comprises a single contact member having a first end, a second end, and a length between the first end and the second end; the first end of each single contact member has a frustoconical shape that extends toward the second end; the second end of each single contact member has a frustoconical shape that extends toward the first end; and the length is equal to or greater than a height of the substrate to be de-bowed.

6. The substrate de-bowing mechanism of claim 1, wherein the first, movable substrate contact member and the second, movable substrate contact member each comprises first and second contact portions that are not directly connected to one another, each contact portion having a first end fixed to a support structure that is rotatable about the respective rotation axis, a second free end, the first and second contact portions extend toward one another, and each of the first and second contact portions has a frustoconical shape; and a distance from the first end of the first contact portion to the first end of the second contact portion is equal to or greater than a height of the substrate to be de-bowed.

7. The substrate de-bowing mechanism of claim 1, further comprising a drive mechanism for rotating the first and second movable substrate contact members about the respective rotation axes.

8. The substrate de-bowing mechanism of claim 7, wherein the drive mechanism comprises one of the following:
a single drive mechanism mechanically connected to each of the first and second movable substrate contact members that rotates each of the first and second movable substrate contact members about the respective rotation axes; or
a first drive mechanism mechanically connected to the first, movable substrate contact member that rotates the first, movable substrate contact member about its rotation axes, and a second drive mechanism mechanically connected to the second, movable substrate contact member that rotates the second, movable substrate contact member about its rotation axes.

9. The substrate de-bowing mechanism of claim 1, wherein each of the first and second movable substrate contact members has a longitudinal axis, and each of the first and second movable substrate contact members is rotatable about its respective longitudinal axis.

10. The substrate de-bowing mechanism of claim 1, wherein an axial distance between the first and second movable card contact members when the first and second movable card contact members are at their first home position is equal to or less than the length of the substrate to be de-bowed.

11. The substrate de-bowing mechanism of claim 1, wherein the substrate comprises a plastic card, a passport or a page of a passport.

12. A substrate processing system that includes the substrate de-bowing mechanism of claim 1.

13. A substrate de-bowing mechanism, comprising:
a substrate support having a substrate travel path;
a first, stationary substrate contact member mounted on the substrate support and positioned to engage a surface of a substrate during de-bowing;
a first, movable substrate contact member rotatably mounted on the substrate support for rotation about a rotation axis, and the first, movable substrate contact member is rotatable between a first home position that is on one side of the substrate travel path to permit engagement of the first, movable substrate contact member with a first surface of the substrate and a second home position that is on a second, opposite side of the substrate travel path to permit engagement of the first, movable substrate contact member with a second surface of the substrate; and
means for heating the substrate.

14. The substrate de-bowing mechanism of claim 13, wherein the means for heating the substrate is positioned to heat the substrate prior to the substrate reaching the substrate support, or the means for heating the substrate is positioned to heat the substrate while the substrate is supported on the substrate support.

15. A substrate de-bowing mechanism, comprising:
a substrate support having a substrate travel path;
a first, stationary substrate contact member mounted on the substrate support and positioned to engage a surface of a substrate during de-bowing;
a first, movable substrate contact member rotatably mounted on the substrate support for rotation about a rotation axis, and the first, movable substrate contact member is rotatable between a first home position that is on one side of the substrate travel path to permit engagement of the first, movable substrate contact member with a first surface of the substrate and a second home position that is on a second, opposite side of the substrate travel path to permit engagement of the first, movable substrate contact member with a second surface of the substrate; and
means for detecting bowing in the substrate.

16. A method of de-bowing a substrate, comprising:
inserting a substrate to be de-bowed onto a substrate support and into a nip between a first, stationary substrate contact member and a second, stationary substrate contact member so that the first, stationary substrate contact member contacts a first side surface of the substrate and the second, stationary substrate contact member contacts a second side surface of the substrate approximate a center of the substrate;
engaging a first, movable substrate contact member with the second side surface of the substrate adjacent to a first end of the substrate, and engaging a second, movable substrate contact member with the second side surface of the substrate adjacent to a second end of the substrate;
rotating the first, movable substrate contact member and the second, movable substrate contact member in opposite directions to cause the substrate to bend about the first, stationary substrate contact member.

17. The method of claim 16, wherein rotating the first, movable substrate contact member and the second, movable substrate contact member in opposite directions comprises rotating the first, movable substrate contact member and the second, movable substrate contact member towards one another.

18. The method of claim 16, wherein rotating the first, movable substrate contact member and the second, movable substrate contact member in opposite directions comprises rotating the first, movable substrate contact member and the second, movable substrate contact member away from one another.

19. The method of claim 16, further comprising heating the substrate prior to rotating the first, movable substrate contact member and the second, movable substrate contact member in opposite directions.

20. The method of claim 16, further comprising detecting a bow in the substrate prior to rotating the first, movable substrate contact member and the second, movable substrate contact member in opposite directions.

21. The method of claim 16, wherein the substrate comprises a plastic card, a passport or a page of a passport.

22. The method of claim 16, further comprising controlling rotation of the first, movable substrate contact member and the second, movable substrate contact member based on control parameters.

23. The method of claim 22, wherein the control parameters are dynamic parameters that are input by a user or from a sensor.

* * * * *